United States Patent [19]
Pfeiffer

[11] Patent Number: 6,128,586
[45] Date of Patent: Oct. 3, 2000

[54] METHOD AND DEVICE FOR CONTROLLING A SELF-REGULATING, DELAYED PROCESS

[75] Inventor: Bernd-Markus Pfeiffer, Karlsruhe, Germany

[73] Assignee: Siemens AG, Munich, Germany

[21] Appl. No.: 09/043,832

[22] PCT Filed: Dec. 16, 1996

[86] PCT No.: PCT/DE96/02417

§ 371 Date: Aug. 28, 1998

§ 102(e) Date: Aug. 28, 1998

[87] PCT Pub. No.: WO97/24648

PCT Pub. Date: Jul. 10, 1997

[30] Foreign Application Priority Data

Dec. 27, 1995 [DE] Germany .......................... 195 48 909

[51] Int. Cl.⁷ .................................................. G05B 13/04
[52] U.S. Cl. ................................ 702/127; 700/31; 700/37
[58] Field of Search ..................... 702/127, 130, 702/136, 182–185; 712/220, 221, 223, 226; 700/71, 37

[56] References Cited

U.S. PATENT DOCUMENTS

| | | | |
|---|---|---|---|
| 4,358,822 | 11/1982 | Sánchez .................... | 700/31 |
| 4,768,143 | 8/1988 | Lane et al. ................. | 700/37 |
| 4,882,526 | 11/1989 | Dine et al. ................. | 318/561 |
| 4,975,827 | 12/1990 | Yonezawa .................. | 700/31 |
| 5,166,873 | 11/1992 | Takatsu et al. ............ | 700/31 |
| 5,260,865 | 11/1993 | Beauford et al. .......... | 700/31 |
| 5,394,322 | 2/1995 | Hansen ..................... | 700/37 |
| 5,486,995 | 1/1996 | Krist et al. ................. | 700/29 |
| 5,537,310 | 7/1996 | Tanake et al. ............. | 700/31 |

FOREIGN PATENT DOCUMENTS

| | | |
|---|---|---|
| 0 379 215 | 7/1990 | European Pat. Off. . |
| 0 416 368 | 3/1991 | European Pat. Off. . |
| 0 520 233 | 12/1992 | European Pat. Off. . |
| 29 43 354 | 5/1981 | Germany . |
| 34 18 501 | 4/1990 | Germany . |
| 39 29 615 | 3/1991 | Germany . |
| 95/04958 | 2/1995 | WIPO . |

OTHER PUBLICATIONS

M. Thoma, "Model Based control schemes: A comparison," 1989, pp. 74–85.**
K. Damert et al., "Modellgestützter Prädiktivregler. Algorithmus and Anwendung auf einen instabilen Polymeerisationsreaktor," 1990, pp. 103–107.**
Merz et al., "Grundkurs der Regelungstechnik," 1988, pp. 90–105.*
K. Verfahren, "Regelungstechnik I," Sep. 5, 1989, p. 216.*
K.D. Meyer Gramann et al., "Fuzzy Control," 1993, pp. A13–A16.*
A.H. Glattfelder et al., "Comment to the behavior of PID–ARW–One–Unit Circuits," Nov. 1987, pp. 464–465.*
O. Sarytschewa et al., "Regelung nach der hö chsten Ableitung der Regelgrösse," 1986, pp. 394–396.**

*Primary Examiner*—Marc S. Hoff
*Assistant Examiner*—Craig Miller
*Attorney, Agent, or Firm*—Kenyon & Kenyon

[57] ABSTRACT

A method and device for controlling a self-regulating, delayed process, in particular a temperature control system, in which, after a first setpoint step change, the manipulated variable is set to its maximum value and an IT1 model of the process is identified on the basis of the step response. The time at which the manipulated variable must be reset for time-optimum control is calculated on the basis of this model. An additional, more precise model is determined if the rate of change of the controlled variable drops below a specific limit after the shut-off time. The parameters of a linear controller are set as a function of the more precise model, after which the controller controls the process in a non-linear mode. When additional setpoint step changes occur, a time for switching to a steady-state manipulated variable is calculated on the basis of the more precise model in order to achieve time-optimal control. The described control device adjusts to the process as early as after the first setpoint step change without requiring any knowledge about the process. The method and device may be used with adaptive controllers.

13 Claims, 2 Drawing Sheets

METHOD AND DEVICE FOR CONTROLLING A SELF-REGULATING, DELAYED PROCESS

FIELD OF THE INVENTION

The present invention relates to a method and device for controlling a self-regulating, delayed process, in particular for controlling temperature.

BACKGROUND OF THE INVENTION

An adaptive controller for self-regulating, delayed processes is described in German Patent No. OS 39 29 615. This adaptive controller has the ability to automatically adjust its parameters to the characteristics of a controlled system which vary over time. To do this, the process response to an abrupt variation in the setpoint is recorded, and an iterative method is used to find a PTn model which can emulate this step response as accurately as possible. Optimum parameters are those of the PTn model in which the error between the step responses of the PTn model and those of the real process, calculated by the method of least error squares, is minimal. Upon completion of process identification, a controller is designed according to the optimum absolute value using the identified process model. Single-loop control loops with PID controllers are a possible controller type. The processes to be controlled are self-regulating, which means that they represent a controlled system in which the step response enters a new steady state.

A disadvantage of this conventional method lies in the fact that, when turning on the conventional adaptive controller, it is often necessary to perform a time-consuming step change test before the controller can be optimized. This test is not completed until the controlled variable once again approaches the new steady-state limit after the setpoint step change. In doing this, the steady-state criterion must be carefully selected, since the identification process will take up too much time if the criterion is too narrowly defined, while too broad a criterion will increase the risk of incorrect identification. In addition, the control quality that can be achieved with a linear PID controller is in principle limited, since a fast start control response is achieved at the price of overshooting the controlled variable.

Another disadvantage of the conventional identification method lies in the creeping time constants, i.e. poles which are very close to the origin of the Laplace plane and can cause the process to behave very much like an integrator, so that a steady state cannot be achieved for a very long time following a step change in the manipulated variable. Consequently, the conventional identification method based on a complete step response is very time-consuming in this type of process.

SUMMARY OF THE INVENTION

An object of the present invention is to provide a method for controlling a self-regulating, delayed process, in particular for controlling temperature, which avoids the above disadvantages, as well as to provide a control device for carrying out the method.

An advantage of the present invention lies in the fact that a time-consuming step change test can be eliminated entirely when turning on a controller. A simple IT1 model approximates the process as early as the first compensation phase following a setpoint step change, and the first setpoint can be approached in a time-optimal fashion and with practically no overshooting. This is especially advantageous when adjusting temperatures to a specific setpoint with the help of an adjustable heating system in which a controller must maintain a constant temperature in spite of external disturbances and set the desired new temperature as quickly as possible when the default setpoint changes, for example during a chemical process. The adaptive controller automatically adjusts to any controlled temperature system, without any parameters being set and without prior knowledge of the process. The controller is optimized during start-up, without the operator having to make any input. As a criterion for determining when a steady state has been reached, the rate of controlled variable change is evaluated and checked when it drops below a definable limit after the manipulated variable has been reset. The process is then identified on the basis of a more precise model, in particular a VZ2 model without an integral component. This model is therefore available as early as the first compensating action and can be used to set the controller. With the aid of the IT1 model during start-up and the VZ2 model after the first time a steady state is reached, shut-off times for time-optimal start control in non-linear mode can be determined by the limit theorem or by monitoring the trajectories in the state space. The controller thus responds much more quickly to setpoint step changes than is possible with a linear controller. When the controlled variable has once again approached a steady state following a setpoint step change, a linear controller which generates the manipulated variable for the process in order to compensate for minor variances in the setpoint as well as external disturbances in linear mode, is set on the basis of the more precise model. The steady-state precision advantages of linear control, for example using a PI or PID controller, are therefore retained, even in the case of time-optimal pilot control.

The controlled systems used in temperature control systems can generally be controlled with simple PI or PID controllers. However, the use of time-optimal pilot control for heat output in non-linear mode means that heating at full capacity can initially be carried out even with smaller setpoint step changes without having to set the linear controller so narrowly that overshooting is likely to occur.

The use of an IT1 model for identifying the process during an early phase of a first step response avoids the disadvantage of more precise self-regulating models in that reliable estimates of the steady-state process gain cannot yet be made at this point. Instead, the maximum rate of rise is dependent on the ratio between the gain and the dominating time constant, for example that of a VZ2 model. However, the IT1 model already provides an indication of the delay time corresponding to the minimum time constant of a VZ2 model and of the rate of rise. It is therefore sufficient for determining the time-optimal shut-off time, which is always on the safe side. The process is identified on the basis of a more precise model, for example a VZ2 model, which is also suitable for determining the parameters of a linear controller, only after temporarily shutting down the heating system for a short period of time. The linear controller does not have to have a D component either in order to dampen oscillations, which do not generally occur in temperature control systems, or to speed up start control when setpoint step changes occur, since the controller in this case uses time-optimal pilot control in non-linear mode. Following additional setpoint step changes, subsequent optimization of the model and controller parameters can be carried out.

To achieve time-optimal heating, the complete manipulated variable is output up to a particular time determined in a VZ2 model by monitoring the system trajectories in the state space. The device then switches to the steady-state manipulated variable estimated with the model gain, and heating continues on this basis. A transition to PI-controlled mode does not take place until the setpoint has been almost reached. To achieve a smooth transition, an integral component of the linear controller is initialized so that the controller outputs the steady-state manipulated value. A control device for carrying out the method can be advantageously implemented with an internal sequence control system that has several different phases differentiated by the controller modes as well as by the models on which process identification is based. The control device can be constructed either as a hardware circuit or an arithmetic unit with a program memory to which a suitable operating program is loaded.

Physical models of temperature control systems can be constructed from elementary PT1 models for the individual subsystems with their thermal capacity and corresponding heat transfer functions. On the whole, this produces VZn models that are usually of a lower order. Real processes seldom reveal more than three relevant time constants. Typical process gains are between 0.5 and 3, and typical time constants are between 1000 and several thousand seconds, depending on the design of the heating system. As a general rule, temperature control systems themselves are not capable of oscillation, i.e. they have only real poles in the open control loop and usually produce only slight delays. Transfer zeros, i.e. higher-order numerator terms in the transfer function, occur when the initial temperature is not sensed as the controlled variable at the end of the heat flow chain, for example when the thermal capacity of the insulation or the furnace walls play a role in furnaces that are heated from the inside. Zeros can produce an overshooting control response. Frequently there is no active cooling system, and a large number of minor negative temperature gradients are observed as positive ones. This effect can be explained with a linear model which is not provided with negative manipulated variables.

Nonlinearity of the temperature control system is also produced by phase transitions, for example evaporation or actuators with non-linear characteristics, such as valves.

DETAILED DESCRIPTION

Figure 1:
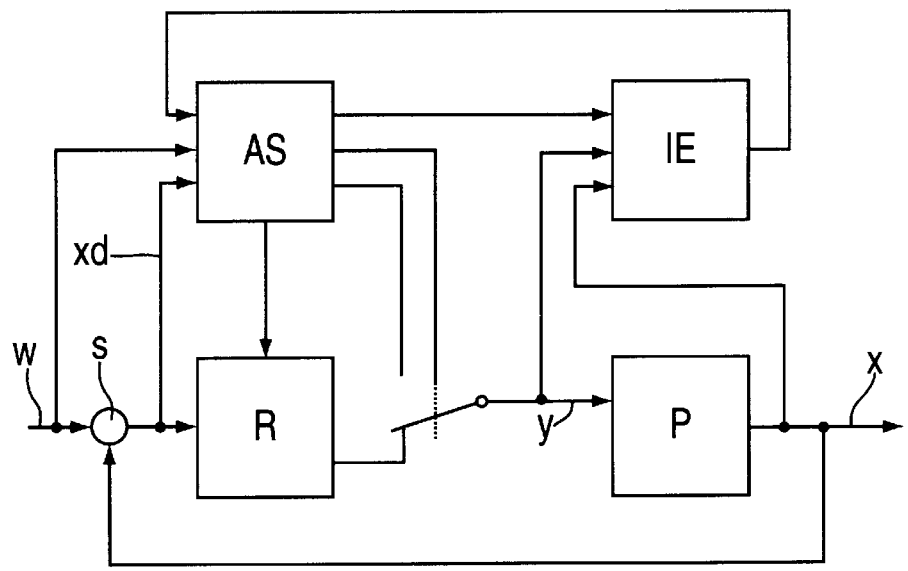
FIG. 1 shows a schematic diagram of a control device in accordance with the present invention.

The control device shown in FIG. 1 is used to control a controlled variable x, for example a temperature, which is measured in a process P. A subtracting element S is used to compare measured controlled variable x to a setpoint w and forms a system deviation signal xd, which is supplied to a linear controller R. In linear mode, controller R generates a manipulated variable y for process P. The control loop is thus closed. In order to identify process P, manipulated variable y and controlled variable x are applied to a device IE, which can be switched in order to calculate optimum parameters of either an IT1 model or at least one more precise model. Signal variations of manipulated variable y and controlled variable x can be stored in device IE for this purpose. The signal variation of manipulated variable y is supplied to the model selected, whose parameters are modified so that the simulated response of the model activated by the stored manipulated variable signal corresponds as closely as possible to the stored real variation of controlled variable x. Those parameters which produce the least possible variance according to the method of least error squares are considered optimum parameters. The parameters of linear controller R, which can be, for example, a PI or a PID controller, are calculated with a sequence control system AS, which receives the parameters determined by device IE, setpoint w, and system deviation xd as input variables. In addition, sequence control system AS generates a switching signal for selecting the correct process model in device IE and a switching signal for determining whether the output variable of controller R in linear mode or a variable predetermined by the sequence control system in non-linear mode should be supplied to process P as manipulated variable y.

Although FIG. 1 shows a single functional schematic diagram of a control device according to the invention, all function blocks can, of course, be combined into a single electronic device or be distributed to several different devices.

Figure 2:
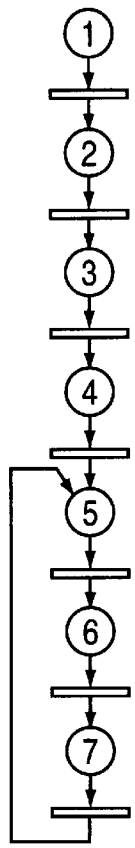
FIG. 2 shows a Petri's network of a sequence control system for the device control illustrated in FIG. 1.

According to the state transition diagram illustrated in FIG. 2, which is also known as a Petri's network, a sequence control system AS contains seven different states or phases which are described below using the example of a temperature control system. These phases are provided with reference numbers 1 through 7. To break down the time curves shown in FIGS. 3 and 4 into these seven phases, the reference numbers are also written at the top of the timing diagram in FIG. 4.

Immediately after the controller is turned on, it enters phase 1 in which the control device outputs via the sequence control system a value of zero as manipulated variable y and waits for a setpoint step change.

Once the setpoint step change has been detected, full-capacity heating is carried out during phase 2.

Once 30% of the rise has been reached, phase 3 begins and a discrete-time IT1 model $$X_{k+1} - X_k = a_2(x_k - x_{k-1}) + b_1 y_k + b_2 y_{k-1}$$

is identified with k as the time index. It is derived from the general second-order ARMA model $$x_{k+1} + a_1 x_k + a_2 x_{k-1} = b_1 y_k + b_2 y_{k-1} \leftrightarrow^z G(z)$$

$$= \frac{b_1 z^{-1} + b_2 z^{-2}}{1 + a_1 z^{-1} + a_2 z^{-2}}$$

by specifying $a_1 = -(1+a_2)$. It is converted to a continuous-time IT1 model $$G(s) = \frac{x(s)}{y(s)} = \frac{K_1}{s(T_1 S + 1)};$$

$$K_1 = \lim_{z \to 1}(l - z^{-1})G(z) = \frac{b_1 + b_2}{1 - a_2};$$

$$T = -\frac{T_0}{\ln a}$$

with $T_0$ as the sampling time, since the poles in the z area are connected to the poles in the s area via $z = e^{T_0 s}$. According to Feldbaum's theorem, the time-optimal control of an IT1 model from initial state $x_0$ to final state $x=w$ should involve only one switching between the maximum and minimum manipulated variable:

$$y = y_{max} \forall t < t_{stop}$$

$$y = 0 \forall t \geq t_{stop}$$

Shut-off time $t_{stop}$ can be determined on the basis of the limit theorem in the Laplace transform. The response of the IT1 element to a square-wave pulse $$y(t) = y_{max}(h(t) - h(t - t_{stop}))$$

of the amplitude $y_{max}$ in the figure area is:

$$x(s) = x_0 + \frac{k_1}{s(T_1 s + 1)} y_{max} \left( \frac{1}{s} - e^{-t_{stop} s} \frac{1}{s} \right)$$

The steady-state limit $$x(t \to \infty) = \lim_{s \to 0} s x(s) = x_0 + K_1 y_{max} t_{stop}$$

is equal to w for $$t_{stop} = \frac{w - x_0}{K_1 y_{max}}$$

This shut-off time estimate is always on the safe side, since the IT1 model assumes complete thermal insulation, whereas heat losses to the environment, which would permit even longer heating periods at full capacity, occur in any real process.

Heating at full capacity continues in phase 3 until the specific shut-off time is reached, which marks the beginning of phase 4.

During phase 4, the heating system is turned off until the heating process has slowed down considerably, i.e. when the average temperature variation per sampling step is less than 0.1% of the step change, averaged over five sampling steps.

Only then does phase 5 begin, during which a rough VZ2 model is identified whose transfer function in the Laplace area is $$G(s) = \frac{K_2}{(T_2 s + 1)(T_3 s + 1)}$$

where $T_2 > T_3$. A PI controller $$G_R(s) = K_p \left( 1 + \frac{1}{T_n s} \right)$$

is designed for this model so that its zero lies to the right of the slow-moving system pole: $T_n = 1.2 * T_2$. This produces an interlaced constellation with v.r.n.l in the relevant portion of the s plane (pole, zero, pole), with the first pole and the zero being produced by PI controller R and the second pole by process P. This constellation does not result in branching of the root locus curve even in the case of large gains. As a result, controller gain $K_p = 5/K_2$ can be selected by default.

The integrator of the controller is initialized so that the steady-state manipulated value estimated on the basis of the VZ2 model is output at the time the controller takes over.

The PI controller continues to work in the same manner in phase 5 until the next positive setpoint step change occurs.

In phase 6, a much more precise VZ2 model is then identified. The time-optimal control of a VZ2 model from new initial state xo to new final state x=w begins when the maximum manipulated value is reached and then changes over to the necessary steady-state manipulated value $y_\infty = w/K_2$:

$$y = y_{max} \forall t < t_{stop}$$

$$y = y_\infty \forall t \geq t_{stop}$$

New shut-off time $t_{stop}$ cannot be derived from the limit theorem, since the VZ2 model reaches final state x=w sometime after the shut-off time for any value of $t_{stop}$. It is therefore necessary to monitor the trajectories in the state space. The states $$z_1 = w - x, z_2 = dz_1/dt = -dx/dt, \bar{z} = (z_1 z_2)^T$$

provide the following state representation of the VZ2 model for w=const.:

$$\bar{z}' = A\bar{z} + \bar{b}y + \bar{g}$$

$$x = \bar{c}^T \bar{z} + w$$

where $$A = \begin{bmatrix} 0 & 1 \\ -\frac{1}{T_2 T_3} & -\frac{T_2 + T_3}{T_2 T_3} \end{bmatrix}, \bar{b} = \begin{bmatrix} 0 \\ \frac{K_2}{T_2 T_3} \end{bmatrix}, \bar{g} = \begin{bmatrix} 0 \\ \frac{w}{T_2 T_3} \end{bmatrix}$$

$$\bar{c}^T = [-1 \ 0]$$

Applying the state transform $$\bar{z} = Q\bar{v}, Q^{-1} = \begin{bmatrix} 1 & T_3 \\ 1 & T_2 \end{bmatrix}$$

transforms the system to diagonal format:

$$\bar{v}' = Q^{-1} A Q \bar{v} + Q^{-1} \bar{b} y Q^{-1} \bar{g}$$

$$x = \bar{c}^T Q \bar{v} + w$$

where $$Q^{-1} A Q = \begin{bmatrix} -\frac{1}{T_2} & 0 \\ 0 & -\frac{1}{T_3} \end{bmatrix}, Q^{-1} \bar{b} = \begin{bmatrix} -\frac{K_2}{T_2} \\ -\frac{K_2}{T_3} \end{bmatrix}, Q^{-1} \bar{g} = \begin{bmatrix} \frac{w}{T_2} \\ \frac{w}{T_3} \end{bmatrix},$$

$$\bar{c}^T Q = \begin{bmatrix} \frac{T_2}{T_2 - T_3} & \frac{T_3}{T_2 - T_3} \end{bmatrix}$$

The differential equations, which are now disassociated for the two new states $v_i$, $i \in \{1, 2\}$, can be solved separately. Based on an initial state $v_{i0}$, the time variation $$v_i(t) = (K_2 y_{max}^{-w+v} {}_{i0}) e^{-t/T_i} + w - K_2 y_{max}$$

is obtained as the response to a manipulated variable step change in the amount of $y_{max}$.

The desired transition from $x = x_0$ to $x = w$ in the new coordinates corresponds to a transition of $$\bar{v} = \begin{bmatrix} w - x_0 \\ w - x_0 \end{bmatrix}$$

in the origin of the v plane. The optimum non-overshooting trajectory is obtained by heating at full capacity up to the point where $v_1$ disappears. The time of switching is obtained on the basis of requirement $V_1 (t_{stop}) = {}^!0$ $$t_{stop} = -T_2 \ln\left(1 - \frac{w - x_0}{K_2 y_{max}}\right)$$

The trajectory for $y = y_\infty$ subsequently follows the $v_2$ axis to the origin.

During phase 6, the heating system is therefore operated at full capacity until the time-optimal time of switching, which marks the beginning of phase 7.

During phase 7, the steady-state manipulated variable is output four times as long until it is transferred to newly designed PI controller R, and phase 5 begins again.

This procedure gives rise to two points which may have a negative effect:

(1) Slight overshooting may occur in systems with transfer zeros, since the time-optimal solution was designed for a model without zeros.

(2) From the start of the setpoint step change to five times the time of switching, the process is in controlled mode, i.e. there is no feedback loop to compensate for disturbances that occur during this heating period. Such disturbances can be corrected by PI controller R only after the heating phase.

Figure 3:
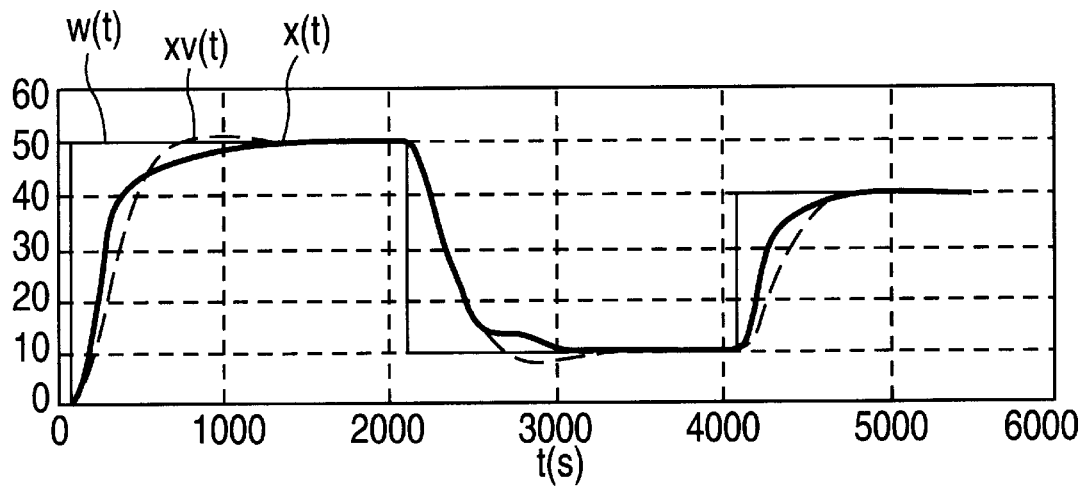
FIG. 3 shows a first timing diagram of a set point and controlled variable curve in a simulated controlled system.
Figure 4:
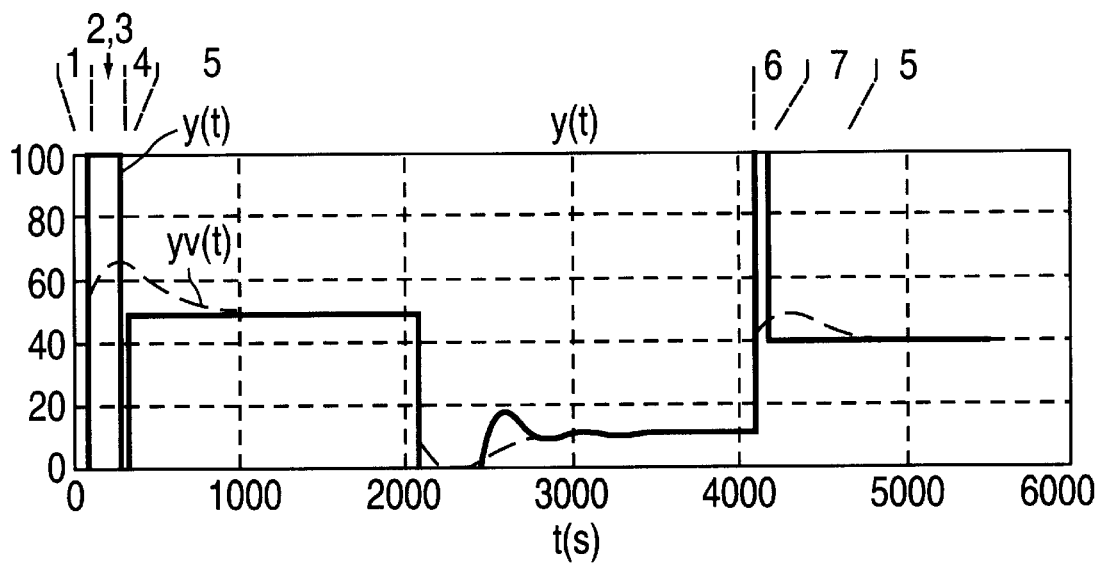
FIG. 4 shows a second timing diagram of a manipulated variable curve in the simulated controlled system.

FIGS. 3 and 4 document the setting procedures when controlling a second-order process. The process is equivalent to a VZ2 model with gain K2=1 and the two time constants T2=250 seconds and T3=100 seconds. For purposes of comparison, the behavior of an optimized PI controller according to the method described in German Patent No. OS 39 29 615 is marked by the thin dotted line on the basis of the curves for manipulated variable yv(t) and controlled variable xv(t).

In FIG. 3, a thin line represents the curve of reference variable w(t), while a heavy line represents the curve of controlled variable x(t), which was obtained with a new control device. In FIG. 4, a heavy line shows the curve of manipulated variable y(t). In this regard, note that curves xv(t) and yv(t) were obtained with a previously optimized PI controller, i.e. a step change test, which is not shown, had to first be carried out when using conventional controllers. The parameters of the PI controller used for the comparison were set to Kp=5 and Tn=300.

FIG. 4 clearly shows the different phases of the sequence control system. During phase 1, lasting between 0 and 100 seconds on the time axis, the control device waits for a setpoint step change w and enters phase 2 at time t=100 after the step change. Complete manipulated variable $y_{max}$ is output on the basis of the time-optimal pilot control. After controlled variable x(t) (FIG. 3) has exceeded approximately 30% of the rise, an IT1 model of the process is identified during phase 3 and the optimum shut-off time calculated. In FIG. 4, the two phases 2 and 3 can therefore not be distinguished from one another and are indicated together at the top of the diagram for the period in which the complete manipulated variable is output. After the calculated shut-off time is reached, manipulated variable y(t) is fully reset in phase 4. If the heating process has slowed down markedly, a more precise model, a VZ2 model in this case, is identified and a PI controller designed for this model. In doing this, the integrator of the PI controller is initialized in such a way that the controller outputs the precise steady-state manipulated value at the beginning of phase 5. In contrast, the curve for manipulated variable yv(t) of the known adaptive controller shown for comparison never reaches the maximum value of manipulated variable y during the heating phase.

Consequently, the rise in controlled variable xv(t) shown for comparison in FIG. 3 is slower than the rise in controlled variable x(t) using the new control device. Another disadvantage of the conventional adaptive controller is the fact that controlled variable xv(t) slightly overshoots the setpoint. Controlled variable x(t), on the other hand, approaches setpoint w aperiodically. At time t=4,100 seconds, another setpoint step change is defined, at which point the sequence control system enters phase 6. A more precise VZ2 model is now calculated by optimizing its parameters again. Since a value is now available for the process gain, steady-state manipulated variable $y_\infty$ can be set for phase 7 after the time of switching calculated on the basis of the VZ2 model. The device remains in phase 7 approximately three times the length of the previous heating period with maximum manipulated variable $y_{max}$, only then switching to the PI controller, whose parameters were set for the more precise VZ2 model and its integral component was set for a smooth transition. The sequence control system is now back in phase 5. A comparison of the curves for controlled variable xv(t) of the known adaptive controller and controlled variable x(t) of the new control device in FIG. 3 clearly shows that the new control device approaches the setpoint much faster and without overshooting following the setpoint step change at time t=4,100 seconds. A much better control quality can therefore be achieved with the new control device.

In the above-described exemplary embodiment of the present invention, the advantages of the new control device were explained on the basis of a process using VZ2 characteristics. However, it is generally also possible to use the new control device to control a process whose model has a zero numerator or a delay in addition to poles. In these cases, the control device is also adjusted automatically during the first heating phase without requiring any prior knowledge of the controlled system. This is usually achieved without overshooting even during the first step change of setpoint w. Starting with the second step change of the reference variable, an even better control quality can be expected which comes very close to a time-optimal heating process. Adjacent and widely distributed time constants, multiple poles and transfer zeros, large and small gains as well as short delays, can be controlled. Slight overshooting can occur during the first heating phase only in the case of delayed processes or transfer zeros.

What is claimed is:

1. A method for controlling a self-regulating, delayed process of a control device, comprising the steps of:

a. turning on the control device;

b. after step a, detecting a first setpoint step change;

c. after step b, setting a manipulated variable from an initial value to a first constant value corresponding to one of a minimum value of the manipulated variable and a maximum value of the manipulated variable, to reduce a system deviation of the control device operating in a non-linear mode;

d. determining a first model of the self-regulating, delayed process after the system deviation is reduced by 10% to 70%;

e. determining a first time for resetting the manipulated variable to the initial value as a function of the first model, the first time being determined so that a controlled variable is within a predetermined range of a setpoint value;

f. resetting the manipulated variable to the initial value at the first time;

g. detecting a rate of change of the controlled variable after resetting the manipulated variable;

h. determining a second model of the self-regulating, delayed process only if the rate of change of the controlled variable is below a predefined limit, the second model being more precise than the first model;

i. setting parameters of a linear controller as a function of the second model; and j. after step i, controlling the self-regulating, delayed process in a linear mode via the linear controller.

2. The method according to claim 1, wherein the control device controls temperature.

3. The method according to claim 2, wherein the second model includes a VZ2 model.

4. The method according to claim 1, wherein the first model includes an IT1 model.

5. The method according to claim 1, wherein step e includes the step of:

determining the time for resetting the manipulated value to produce time-optimal control of the self-regulating, delayed process.

6. The method according to claim 1, wherein the first model is determined after the system deviation is reduced by 30%.

7. The method according to claim 1, further comprising the steps of:

detecting a further setpoint step change;

setting the manipulated variable to a second constant value, the second constant value corresponding to one of the maximum value and minimum value of the manipulated variable, to reduce the system deviation of the control device operating in the non-linear mode;

optimizing the parameters of the linear control device;

determining a second time for setting the manipulated variable to a steady-state value as a function of the second model, the second time being determined so that the controlled variable reaches the setpoint value; and switching the control device to the linear mode when the controlled variable substantially reaches the setpoint, the parameters of the linear controller being set as a function of the optimized parameters.

8. The method according to claim 7, wherein the control device switches from the non-linear mode to the linear mode after the manipulated variable has been set to the steady-state value for a period of time, the period of time being approximately four times a length of time during which the manipulated variable was set to the second constant value.

9. The method according to claim 1, wherein the linear controller includes a PI controller.

10. The method according to claim 9, further comprising the step of:

initializing a component of the PI controller to provide a smooth transition from the non-linear mode to the linear mode.

11. The method according to claim 9, wherein the PI controller has a reset time, the reset time being greater than a maximum time constant of the second model, the second model including a VZ2 model.

12. The method according to claim 11, wherein the reset time of the PI controller is 1.2 times the maximum time constant.

13. A control device, comprising:

a parameter calculating device calculating a first plurality of parameters as a function of a first model of the self-regulating, delayed process and a second plurality of parameters of the first model;

an identifier device receiving a manipulated variable and a controlled variable, identifying the self-regulating, delayed process and calculating a plurality of optimum parameters for at least one of the first model and a second model, the second model being more precise than the first model;

a linear controller set as a function of the first plurality of parameters and calculating a first manipulated variable as a function of a system deviation;

a sequence control system receiving a setpoint, the system deviation and the second plurality of parameters of the first model and calculating a second manipulated variable in a non-linear mode, the sequence control system generating two switching signals, wherein the two switching signals are used to perform at least one of a selection of the first model and an operation of a second switching device, the second switching device providing at least one of the first manipulated variable and the second manipulated variable to the self-regulating, delayed process.

* * * * *